(12) United States Patent
Misak et al.

(10) Patent No.: US 11,697,752 B2
(45) Date of Patent: Jul. 11, 2023

(54) SHAPED CERAMIC ABRASIVE PARTICLE AND METHOD FOR PRODUCING A SHAPED CERAMIC ABRASIVE PARTICLE

(71) Applicant: Robert Bosch GmbH, Stuttgart (DE)

(72) Inventors: Jiri Misak, Dübendorf (CH); Moritz Oldenkotte, Achern (DE); Stefan Fuenfschilling, Öhningen (DE)

(73) Assignee: Robert Bosch GmbH, Stuttgart (DE)

( * ) Notice: Subject to any disclaimer, the term of this patent is extended or adjusted under 35 U.S.C. 154(b) by 639 days.

(21) Appl. No.: 16/614,946

(22) PCT Filed: Jun. 5, 2018

(86) PCT No.: PCT/EP2018/064734
§ 371 (c)(1),
(2) Date: Nov. 19, 2019

(87) PCT Pub. No.: WO2019/001908
PCT Pub. Date: Jan. 3, 2019

(65) Prior Publication Data
US 2020/0181469 A1    Jun. 11, 2020

(30) Foreign Application Priority Data

Jun. 27, 2017    (DE) .................... 10 2017 210 799.5

(51) Int. Cl.
*C09K 3/14*        (2006.01)
*B24D 3/00*        (2006.01)
(Continued)

(52) U.S. Cl.
CPC .............. *C09K 3/1409* (2013.01); *B24D 3/00* (2013.01); *C04B 35/00* (2013.01); *C04B 35/10* (2013.01);
(Continued)

(58) Field of Classification Search
None
See application file for complete search history.

(56) References Cited

U.S. PATENT DOCUMENTS 6,312,324 B1    11/2001    Mitsui et al.
6,391,072 B1    5/2002    Garg
(Continued)

FOREIGN PATENT DOCUMENTS

DE            2 349 326 A    4/1974
DE    10 2015 108 812 A1    12/2016
(Continued)

OTHER PUBLICATIONS

PCT Written Opinion of the International Search Authority dated Nov. 16, 2018. (Year: 2018).*
(Continued)

*Primary Examiner* — Jiong-Ping Lu
(74) *Attorney, Agent, or Firm* — Maginot, Moore & Beck LLP

(57) ABSTRACT

A shaped ceramic abrasive particle, in particular on the basis of alpha-$Al_2O_3$, includes at least three faces, at least two faces of which form a common vertex on which at least one corner common to the three faces lies. The abrasive particle has at least one structural weakening element. The disclosure also relates to an abrasive article including the abrasive particles, and a method for producing the abrasive particles.

19 Claims, 9 Drawing Sheets

(51) Int. Cl.
*C04B 35/10* (2006.01)
*C04B 35/111* (2006.01)
*C04B 35/00* (2006.01)

(52) U.S. Cl.
CPC ............ *C04B 35/1115* (2013.01); *C09K 3/14* (2013.01); *C04B 2235/94* (2013.01)

(56) References Cited

U.S. PATENT DOCUMENTS

| | | |
|---|---|---|
| 8,142,891 B2 | 3/2012 | Culler et al. |
| 2010/0146867 A1 | 6/2010 | Boden et al. |
| 2013/0236725 A1 | 9/2013 | Yener et al. |
| 2013/0288574 A1 | 10/2013 | Seider et al. |
| 2014/0106126 A1 | 4/2014 | Gaeta et al. |
| 2014/0109490 A1* | 4/2014 | Boden .................. C04B 35/632 51/309 |
| 2016/0362589 A1* | 12/2016 | Bauer ...................... B01J 2/006 |

FOREIGN PATENT DOCUMENTS

| | | |
|---|---|---|
| DE | 10 2017 207 322 A1 | 11/2018 |
| EP | 0 947 485 A1 | 10/1999 |
| WO | 2012/061033 A2 | 5/2012 |
| WO | 2014/020075 A1 | 2/2014 |
| WO | 2015/090283 A1 | 6/2015 |
| WO | 2016/105469 A1 | 6/2016 |
| WO | 2016/201104 A1 | 12/2016 |

OTHER PUBLICATIONS

International Search Report corresponding to PCT Application No. PCT/EP2018/064734, dated Nov. 16, 2018 (German and English language document) (9 pages).

\* cited by examiner

SHAPED CERAMIC ABRASIVE PARTICLE AND METHOD FOR PRODUCING A SHAPED CERAMIC ABRASIVE PARTICLE

This application is a 35 U.S.C. § 371 National Stage Application of PCT/EP2018/064734, filed on Jun. 5, 2018, which claims the benefit of priority to Serial No. DE 10 2017 210 799.5, filed on Jun. 27, 2017 in Germany, the disclosures of which are incorporated herein by reference in their entirety.

The invention relates to a shaped ceramic abrasive particle, an abrasive article and also a process for producing a shaped ceramic abrasive particle.

BACKGROUND

Shaped ceramic abrasive particles based on alpha-$Al_2O_3$ (alpha-aluminum oxide) are known from the prior art. Shaped abrasive particles are abrasive particles which have a defined shape and a defined size. The abrasive particles acquire their defined shape and defined size as a result of a defined shaping process. Thus, for example, WO 2014/020075 A1 describes various advantageous geometries for ceramic abrasive particles. Unshaped or irregularly shaped abrasive particles, which are also referred to as broken abrasive particles, are also known from the prior art. The advantage of shaped ceramic abrasive particles is their better abrasive performance compared to unshaped or irregularly shaped abrasive particles.

Two methods, which are likewise described in WO 2014/020075 A1, are, inter alia, known from the prior art for producing shaped ceramic abrasive particles. Alpha-$Al_2O_3$ is known from the prior art as starting material for producing shaped ceramic abrasive particles. If alpha-$Al_2O_3$ is used as starting material, the slip process is particularly suitable for producing the abrasive particles. The use of precursors of alpha-$Al_2O_3$, which are converted into alpha-$Al_2O_3$ only during production of the abrasive particles, as starting material for the production process is also known from the prior art. Examples of suitable precursors are the aluminum oxide hydroxides boehmite (gamma-AlO(OH)) and diaspore (alpha-AlO(OH)) and also the aluminum orthohydroxides gibbsite (gamma-$Al(OH)_3$) and bayerite (alpha-$Al(OH)_3$). To produce the abrasive particles from these precursors, use is made of the sol-gel process which gives abrasive particles having a very fine microstructure.

There is comprehensive literature on the subject of shaped and partially shaped sol-gel abrasive particles.

However, the starting material, alpha-$Al_2O_3$ or a precursor of alpha-$Al_2O_3$, and the production process, sol-gel process or slip process, result in significant differences in the behavior of the shaped ceramic abrasive particles produced therefrom.

There continues to be a need in the abrasives industry to achieve a further increase in the removal of material in the machining of metallic workpieces.

SUMMARY

The disclosure proceeds from a shaped ceramic abrasive particle, in particular a shaped ceramic abrasive particle based on alpha-$Al_2O_3$, having at least three faces of which at least two faces form a common edge on which at least one corner common to the three faces is located. According to the disclosure, the abrasive particle has at least one structure-weakening element.

For the purposes of the present disclosure, a shaped abrasive particle is an abrasive particle which has a defined geometry. A shaped abrasive particle of defined geometry has a defined three-dimensional shape of defined size. The defined shape of defined size is obtained by means of a defined shaping process in the production of the abrasive particle. The defined geometry of the shaped abrasive particle should be reproducible. The shaped abrasive particle should be able to be produced repeatedly and in a targeted manner in the desired defined geometry. A shaped abrasive particle is, in particular, not a broken or partially broken abrasive particle which can be produced by comminution, in particular crushing.

Possible defined three-dimensional shapes are, in particular, geometric bodies which have three or more faces, one or more edges and one or more corners and/or apexes. Two adjoining faces form a shared edge, while three faces adjoin one another at a shared corner. A corner typically delimits an edge.

For the purposes of the present disclosure, a face is a contiguous two-dimensional part of the surface of the abrasive particle which part consists of points through which a well-defined, imaginary tangential plane can in each case be placed on the abrasive particle. Such a face can be flat or curved. A curved face can be concave or convex. Furthermore, the face can also have at least one flat section and at least one curved section which go into one another without an edge located in between.

An edge is a contiguous one-dimensional part of the surface of the abrasive particle which part consists of points at which two faces or two parts of one and the same face are in contact with one another, with the tangential planes of the two faces or parts of faces not running continuously at these points. At the edge, there is preferably an internal angle which is less than 150°, preferably less than 120°, particularly preferably less than 90°, or greater than 210°, preferably greater than 240°, particularly preferably greater than 270°. The internal angle is the angle between the two abovementioned tangential planes of the two faces or parts of faces, i.e. the angle between the normal vectors of these tangential planes. One or more edges of the abrasive particle can be sharp, in particular pointed, or else rounded or flattened. In particular, one or more edges can have a chamfer.

A point on the surface of the shaped abrasive particle is considered to be a corner when an imaginary cone can notionally be inverted over part of the abrasive particle in such a way that this part of the abrasive particle is located in the interior of the cone and the point forms the apex of the cone. The opening angle of the cone is preferably less than 150°, more preferably less than 120° and particularly preferably less than 90°. One or more corners of the abrasive particle can be sharp, in particular pointed, or else rounded or flattened.

Examples of geometric bodies which are suitable for shaped abrasive particles are polyhedra, for example tetrahedra, pentahedra, hexahedra and others. The geometric body of the shaped abrasive particle can, in particular, be a cuboid, a prism, a pyramid or the like.

In one embodiment, the shaped abrasive particle has at least one base area which can be polygonal, for example triangular or quadrilateral, in particular rectangular or square, star-shaped, the shape of a polygon, in particular isogon, or partly angular and partly curved, for example curved in a round or oval manner. In the case of a base area having a plurality of corners, one or more side edges can be straight or curved. The geometric body also has, in particular, at least one side face. The geometric body can, in particular, have a base area and one or more side faces and also at least one apex. Such an abrasive particle can have the shape of a pyramid. The at least one side face can form an outer surface. As an alternative or in addition, the geometric body of the shaped abrasive particle can have at least one top surface which can be polygonal, for example triangular or quadrilateral, in particular rectangular or square, star-shaped, the shape of a polygon, in particular isogon, or partly angular and partly curved, for example curved in a round or oval manner. In the case of a top surface having a plurality of corners, one or more side edges can be straight or curved. The at least one top surface and the at least one base area can have the same geometric shape or different geometric shapes. The top surface and the base area can be arranged essentially parallel to one another. However, they can also be arranged at an angle to one another. The area occupied by the base area and the top surface can be essentially the same or different.

The at least one top surface can be joined to the base area via at least one side face. Here, the at least one side face can form an outer surface between the base area and the top surface. If the base area and the top surface are each formed by a polygon having a number n of corners, the shaped abrasive particle can, for example, have n side faces. The geometric body can have the shape of a prism with a base area and a top surface and also a plurality of side faces. Furthermore, the geometric body having a base area and a top surface and also a plurality of side faces can also have the shape of a frustum of a pyramid. The at least one base area and/or top surface can, for example, be formed by an equilateral and equiangular polygon, in particular an equilateral triangle or square. As an alternative, the at least one base area can also be formed by a polygon whose sides are not all the same. Straight or slanted geometric bodies are also suitable. Thus, the shaped abrasive particle can be, for example, a straight or slanted prism, a straight or slanted pyramid or the like.

If the geometric body of the shaped abrasive particle has at least one base area, at least one top surface and one or more side faces, the body of the abrasive particle preferably has a flat shape. A flat geometric body is considered to be a body whose at least one base area and/or top surface has an extension, in particular maximum extension, which is a multiple of an extension, in particular maximum extension, between the base area and the top surface along the one or more side faces. The extension of the base area and/or top surface can, for example, be defined by a length of a side edge of the base area and/or top surface. The extension between the base area and the top surface along a side face can be defined by a thickness of the body. Thus, the ratio of the extension of the base area and/or top surface to the extension between base area and top surface of the geometric body can, for example, be in the range from 2 to 10, in particular in the range from 2 to 5. Thus, for example, the ratio of side edge length to thickness of the geometric body is from 2 to 10, in particular from 2 to 5.

The shaped abrasive particle of defined geometry can also be formed by any three-dimensional shape which can be produced reproducibly. For the purposes of the present disclosure, the expression any three-dimensional reproducible shape is intended to mean a shape in which a plurality of faces in free form together produce a three-dimensional body.

In one embodiment, the defined three-dimensional shape of the ceramic abrasive particle can be a regular three-sided right prism. The ceramic abrasive particle in this case has a base area and a top surface which are each formed by three side edges of equal length. Here, the base area and the top surface are of essentially the same size. The base area and the top surface are arranged essentially parallel to one another. The base area and the top surface are separated from one another by three essentially equal side faces which form an outer surface of the prism. The regular three-sided right prism has, in particular, a flat shape. The ratio of side edge length to thickness of the prism is, for example, in the range from 2 to 10, in particular in the range from 2 to 5, very particularly preferably in the range from 2.75 to 4.75.

The abrasive particle of the disclosure can have a size in the entire size range which is also customary for conventional abrasive particles. Abrasive particles having larger sizes usually lead to greater removal of material from a machined surface than smaller abrasive particles. For example, the abrasive particle can have a size in the range from 100 μm to 2000 μm. This size can be determined experimentally by means of a microscope. For the purposes of the present disclosure, it is considered to be the diameter of a circumscribing circle of the microscope image of the abrasive particle, i.e. the smallest diameter of a circle which encloses the image. As an alternative, the size can also be considered to be an average diameter of the abrasive particle. The average diameter is, for the present purposes, the diameter corresponding to the average distance of all points on the surface of the abrasive particle from the center of the diameter, in particular the geometric midpoint of the abrasive particle.

It may be pointed out that in the case of abrasive particles having a base area in the form of a triangle, in particular an equilateral triangle, it is presumed that when such abrasive particles are electrostatically scattered about one to two thirds become oriented in such a way that an apex points away from the substrates, while further abrasive particles become oriented so that the apex points toward the substrate. This results in advantageous abrasive properties of an abrasive article on which the abrasive particles have been scattered.

In one embodiment, alpha-$Al_2O_3$ is used as starting material for producing the ceramic abrasive particle of the disclosure. Alpha-$Al_2O_3$ is known per se to those skilled in the art and is commercially available, for example in powder form. The slip process is particularly suitable for producing the abrasive particles of the disclosure. In particular, alpha-$Al_2O_3$ itself can be employed as starting material for the purposes of the present disclosure. As an alternative, the sol-gel process is also suitable for producing the abrasive particles of the disclosure.

In general, it is presumed that abrasive particles having a defined shape have improved properties in many respects: If the abrasive particles have a defined shape and size at the commencement of the process in which they are produced, a subsequent sorting step, by means of which the abrasive particles would otherwise have to be separated into various sizes, is dispensed with. In addition, the shapes and sizes also remain virtually unchanged between different production batches, which makes the abrasive properties very readily reproducible. Furthermore, shaped abrasive particles typically result in an increased total removal of material, have a longer life, result in an improved surface quality of the machined surface and/or result in a more reproducible result of abrasion.

According to the disclosure, the shaped ceramic abrasive particle has at least one structure-weakening element, preferably a plurality of structure-weakening elements. For the purposes of the present disclosure, a structure-weakening element is, in particular, a material weakening which can be introduced into the shaped abrasive particle in a targeted and reproducible manner and has a positive effect on the abrasive performance brought about by the shaped abrasive particle. The at least one structure-weakening element results, in particular, in a significant improvement in the abrasive performance of the abrasive particle. In particular, the at least one structure-weakening element results in a significant improvement in the initial abrasive performance and also the medium-term and/or long-term abrasive performance of the abrasive particle.

It is assumed that during grinding of a workpiece, an abrasive particle of the abrasive article used firstly has to break in order to form at least one sharp edge, in particular the fracture edge, at the point of fracture. Such a fracture typically occurs at the weakest place in the material of the abrasive particle. In the case of shaped abrasive particle of the prior art, this weakest place in the material is located at an undefined and in particular unreproducible position in or on the abrasive particle, so that each abrasive particle of an abrasive article of the prior art in principle breaks at a different place. However, it can be observed in a plurality of documents in the prior art that the abrasive particle breaks at a weakest place which is located approximately in the middle or centrally in the shaped abrasive particle. A disadvantage associated with such shaped abrasive particles in which the weakest place, and thus the fracture position, is located approximately in the middle or centrally in the abrasive particle is that after fracture of the abrasive particle an unnecessarily large amount of material of the shaped abrasive particle is lost, since the part of the abrasive particle which breaks away is typically no longer bonded to the abrasive disk and flies away during the grinding operation. This lost material could, in the case of a fracture position introduced in a targeted manner and reproducibly, grind for a significantly longer time and thus increase the life of the abrasive article. According to the disclosure, the introduction of at least one structure-weakening element introduced in a targeted and reproducible manner shifts this fracture position in an advantageous way. Consequently, the disclosure provides a defined weakest place in or on the material which is produced by the at least one structure-weakening element introduced in a targeted and reproducible manner and at which the abrasive particle typically breaks at the beginning of a grinding operation. This makes it possible to bring about the advantageous and desirable sharp edges of the abrasive particle without losing a large part of the material of the abrasive particle. Retention of the large part of the material which during the further course of a grinding operation is available for further fractures and can thus form sharp edges again results in an extended life combined with a constantly high abrasive performance of the abrasive particle. In particular, the abrasive particles have a longer life because small pieces can repeatedly break away from the abrasive particles during grinding so as to give fresh cutting edges and cutting surfaces. The abrasive particles sharpen themselves as a result.

In one embodiment of the abrasive particle of the disclosure, the at least one structure-weakening element is realized as an open or closed recess in the material of the abrasive particle. For the purposes of the present disclosure, an open recess in the material of the abrasive particle is, in particular, an indentation, a notch, a hollow, a crater or the like, i.e. a recess which extends to the surface of the abrasive particle and is thus open to the surroundings of the abrasive particle. In particular, the open recess in the material is located at least partly in the interior of the material. In particular, the open recess in the material is visible from the outside. On the other hand, a closed recess in the material is a recess which is essentially enclosed by the material of the abrasive particle, i.e., for example, a void, a bubble, a pore, a cavity or the like. The expression "essentially enclosed" is intended to mean that the recess in the material can in principle also have one or more small openings which may extend to the surface of the abrasive particle, so that the recess in the material is not completely surrounded by the enclosing structure, but the size of the opening is negligible compared to the recess in the material. For example, a bubble which is present in the abrasive particle and from which a microcapillary having a comparatively small diameter extends to the surface of the abrasive particle is considered to be an essentially enclosed recess in the material of the shaped abrasive particle. Such a closed recess in the material is located completely within the abrasive particle and is not visible from the outside.

The existence of recesses according to the disclosure in the material appears, according to present-day knowledge, to influence the structure of the shaped ceramic abrasive particle surrounding or enclosing the recess in the material. In particular, an influence appears to be exerted on a strength or elasticity of the structure of the shaped ceramic abrasive particle surrounding or enclosing the recess in the material. As a consequence, in the case of targeted production, in particular introduction, of such open or closed recesses in the material in or into the abrasive particle, a physical property of the abrasive particle can be consciously influenced and/or controlled. In particular, a strength or toughness or elasticity of the structure of the shaped ceramic abrasive particle surrounding or enclosing the recess in the material can thus be consciously influenced and/or controlled and the fracture properties of the shaped abrasive particle can consequently also be consciously influenced and/or controlled. It has also been found that open recesses in the material improve the abrasive performance due to more frequent occurrence of sharp apexes and/or sharp corners.

In one embodiment of the abrasive particle of the disclosure, the at least one structure-weakening element has a plurality of structure-weakening elements configured as open recesses in the material or as closed recesses in the material. In particular, the abrasive particle has from 2 to 100, preferably from 2 to 10, particularly preferably from 2 to 3, structure-weakening elements configured as open or closed recesses in the material. In this way, a plurality of weak places and thus potential fracture positions at which sharp edges can be formed during a grinding operation by fracture of the abrasive particle can advantageously be provided in the shaped abrasive particle. In one embodiment, the structure-weakening elements have an average spacing relative to one another which is from 5% to 95%, in particular from 60% to 80%, of the average diameter of the abrasive particle. In one embodiment, the structure-weakening elements have an average spacing relative to one another which is from 80 µm to 120 µm. Furthermore, it has been found that the strength of the material of the abrasive particle on average decreases with increasing number of open recesses in the material and an increased fracture tendency can be brought about in this way.

In one embodiment of the abrasive particle of the disclosure, the at least one structure-weakening element is located eccentrically to the center of gravity of the abrasive particle. In this way, the weakest place in the material, i.e. the most probable fracture position of the abrasive particle, is not positioned at the center of gravity and thus centrally or in the middle in the abrasive particle. In particular, the weakest place in the material can in this way advantageously be moved into a region located further out in the abrasive particle. According to present-day knowledge, this can result in comparatively large fragments (residual material) of the abrasive particle still remaining after fracture of the abrasive particle and being able to fracture again during a grinding operation and thus produce further, fresh and therefore particularly sharp cutting edges. In the case of a plurality of structure-weakening elements configured as open recesses in the material or as closed recesses in the material, an eccentric arrangement means, in particular, that the geometric midpoint or center of gravity of the plurality of structure-weakening elements is positioned eccentrically to the center of gravity of the abrasive particle.

In one embodiment of the abrasive particle of the disclosure, the at least one structure-weakening element configured as open recess in the material is located on one of the at least three faces, on the at least one edge or on the at least one corner of the abrasive particle. This makes it possible to realize an abrasive particle which has a very eccentrically arranged structure-weakening element and in which the potential fracture position is far removed from the center of gravity. On the basis of present-day knowledge, when an abrasive particle according to the disclosure is broken, the fracture advantageously occurs in such a way that only a comparatively small fragment breaks away from the abrasive particle. The remaining abrasive particle has a sharp grinding edge. Furthermore, the remaining, still comparatively large abrasive particle can break again, in particular a number of times, and thus also form further sharp edges during the further course of a grinding operation. In particular, a particularly good abrasive performance which remains high in the long term can consequently be brought about. Furthermore, the structure-weakening element can be realized in a particularly simple way, especially, for example, as early as during the shaping process in the production of the abrasive particle by means of an appropriately shaped casting mold.

In one embodiment of the abrasive particle of the disclosure, the at least one structure-weakening element configured as closed recess in the material has a distance from one of the at least three faces or from the at least one edge or from the at least one corner of the abrasive particle which is from 1% to 50% of the average diameter of the abrasive particle, in particular from 5% to 40%. In one embodiment of the abrasive particle of the disclosure, the at least one structure-weakening element configured as closed recess in the material is at a distance from one of the at least three faces or from the at least one edge or from the at least one corner of the abrasive particle which is from 5 µm to 500 µm, preferably from 5 µm to 100 µm, particularly preferably from 5 µm to 30 µm. This makes it possible for the structure-weakening element of the abrasive particle configured as closed recess in the material to be arranged very eccentrically. In particular, a potential fracture position can be produced far removed from the center of gravity and thus particularly eccentrically in the abrasive particle. On the basis of present-day knowledge, when a fracture occurs in the abrasive particle in the case of an abrasive particle according to the disclosure, the fracture advantageously occurs in such a way that only a comparatively small fragment breaks off from the abrasive particle. The remaining abrasive particle has a sharp grinding edge. Furthermore, the remaining, still comparatively large abrasive particle can break again, in particular a plurality of times, and thus also form further sharp edges during the further course of a grinding operation. In particular, a particularly good and lastingly high abrasive performance can be brought about as a result.

In one embodiment of the abrasive particle of the disclosure, the at least one structure-weakening element has an essentially convexly curved, in particular spherical, preferably ball-like, shape. In one embodiment, the convexly curved, in particular spherical, preferably ball-like, shape has a radius of curvature of from 10 µm to 200 µm, preferably from 25 µm to 175 µm, particularly preferably from 25 µm to 50 µm. In one embodiment of the abrasive particle of the invention disclosure, the at least one structure-weakening element has an essentially convexly curved, in particular spherical, preferably ball-like, shape having a radius R which is such that a ratio of R to the thickness D of the abrasive particle is from about 0.05 to 2, preferably from about 0.1 to 1, particularly preferably from about 0.2 to 0.5.

A convexly curved shape of the recess in the material represents a particularly simple and therefore also particularly reproducible realization of the recess in the material and thus of the structure-weakening element.

A reliable and reproducible fracturing effect can be achieved. Furthermore, it has been found that a force distribution at a spherical, preferably ball-like, recess in the material leads to a particularly reproducible fracture position in the shaped abrasive particle.

In one embodiment of the abrasive particle of the disclosure, the at least one structure-weakening element is realized as a material projection and/or material overhang at the at least one edge and/or at the at least one corner of the abrasive particle. For the purposes of the present disclosure, a material projection and/or material overhang is in particular material which additionally supplements the specific geometry of the abrasive particle, in particular material which extends the specific geometry of the abrasive particle. Here, the material which additionally supplements the specific geometry of the abrasive particle is provided in a targeted manner and reproducibly on the abrasive particle. In particular, the material concerned is not remnants or artefacts of an imprecise manufacturing process, but specifically provided structure-weakening elements. The existence of material projections and/or material overhangs according to the disclosure appears to have, on the basis of present-day knowledge, an advantageous influence on the strength or toughness or elasticity of the abrasive particle which promotes targeted fracture of the abrasive particle. Consequently, a susceptibility to fracture or fracture tendency of the abrasive particle can be consciously influenced and/or controlled when such a material projection and/or material overhang on the abrasive particle is appropriately arranged. On the basis of present-day knowledge, the influence appears to be brought about by a force distribution and/or torque distribution which can be exploited deliberately according to the disclosure and acts on a corresponding abrasive particle in a grinding operation. In particular, it is assumed that the provision of a material projection and/or material overhang according to the disclosure enables a force acting on the abrasive particle, in particular a torque acting on the abrasive particle or a lever action, to be varied and set advantageously. A reproducible fracture action, i.e. fracture susceptibility or fracture tendency, is the result. Consequently, the fracture properties of the shaped abrasive particle can be consciously influenced and/or controlled according to the disclosure in this way.

Furthermore, it may be remarked that not only are the fracture properties of the shaped abrasive particle influenced in an advantageous way but an adhesive property of the abrasive particle on an abrasive article substrate is also improved. Formation of the material projection and/or material overhang produces projections and/or undercuts which supplement the specific geometric shape of the abrasive particle and can be surrounded and/or wetted by a binder and thus serve to improve the adhesion property.

In one embodiment, in which the abrasive particle is, for example, configured as a regular three-sided right prism in which a base area and a top surface are arranged essentially in parallel to one another and are separated from one another by three side faces, the structure-weakening element can, for example, be realized as material projection and/or material overhang of the top surface extending beyond the side faces essentially in the direction of the plane of the top surface at least in the region of at least one corner formed by the top surface. Here, the additional material projects beyond the remaining material of the abrasive particle at least at one edge and at one corner. In particular, the structure-weakening element thus represents a mushroom-like material projection and/or material overhang since, in side view, the abrasive particle projects in a manner similar to a mushroom at the top surface.

In one embodiment of the abrasive particle of the disclosure, the material projection and/or the material overhang is realized along at least 10%, preferably at least 30%, particularly preferably at least 90%, of the length of the at least one edge. The length of the material projection, measured at the length of an edge over which the material projection and/or material overhang projects, appears, on the basis of present-day knowledge, to have a great influence on the physical force distribution which acts on an abrasive particle in a grinding operation. With increasing length, an increasing lever action, which significantly influences the fracture properties of the abrasive particle, is to be expected. It has been found that, in particular, even small material projections which project beyond only small proportions of an edge, for example 5-25%, have a large influence.

In one embodiment of the abrasive particle of the disclosure, the material projection and/or the material overhang has a thickness of from about 10 µm to 100 µm, preferably from 10 µm to 50 µm, particularly preferably from 10 µm to 30 µm. In a manner similar to the length along which the material projection and/or the material overhang projects, the thickness of the projecting material projection and/or material overhang also has, according to present-day knowledge, a significant influence on the physical force distribution which acts on an abrasive particle during a grinding operation. With decreasing thickness, an increasing fracture tendency of the material projection and/or the material overhang itself can be expected, while with increasing thickness an increasing fracture tendency of the total abrasive particle can be expected due to an increased lever action at the abrasive particle. In particular, the material projection then produces a necessary force and/or a necessary torque for breaking the abrasive particle. It is possible for the material projection to have a lower strength than the remaining abrasive particle, so that the material projection can break and thus form a sharp edge even at low stresses (for example grinding with a low contact pressure). In an illustrative embodiment, a thickness of 20 µm is selected, where this value represents an advantageous compromise between the two above-mentioned effects.

It has also been found that a particularly thin material projection can itself represent a very sharp cutting edge and thus likewise increases the abrasive performance of the abrasive particle, regardless of an influence on the fracture properties of the abrasive particle.

In one embodiment of the abrasive particle of the disclosure, the material projection and/or the material overhang extends for a distance of at least 20 µm, preferably at least 50 µm, particularly preferably at least 100 µm, beyond at least one edge. In a manner similar to the length along which the material projection and/or the material overhang projects, and the thickness of the material projection and/or the material overhang, the distance for which the material projection and/or the material overhang extends beyond at least one edge of the abrasive particle also has, according to present-day knowledge. With increasing distance, an increasing fracture tendency of the material projection and/or the material overhang itself can be expected, while with decreasing distance an increasing fracture tendency of the overall abrasive particle can be expected. In particular, the material projection then produces a necessary force and/or a necessary torque for fracture of the abrasive particle. In an illustrative embodiment, the distance for which the material projection and/or the material overhang extends beyond at least one edge of the abrasive particle is selected as 50 µm, with the value representing a compromise between the two abovementioned effects.

In one embodiment of the abrasive particle of the disclosure, the material projection and/or the material overhang includes an angle in the range from 10° to 90°, preferably from 20° to 80°, to at least one of the at least three faces. In particular, the angle can be realized by a curved, in particular continuous, transition between the material projection and/or material overhang and the at least one of the at least three faces. Here, the curved, in particular continuous, transition can be describable by a radius of curvature. The radius of curvature can, in particular, be at least 25 µm, preferably at least 50 µm, particularly preferably at least 100 µm. In an illustrative embodiment, the radius of curvature has a value of 70 µm.

In one embodiment, the shaped ceramic abrasive particle based on alpha-$Al_2O_3$ obtains a proportion of $ZrO_2$ of from 15% by weight to 30% by weight. In one embodiment, the alpha-$Al_2O_3$ has an average crystallite size of from 0.5 µm to 3 µm, preferably from 0.6 µm to 2 µm, and the $ZrO_2$ has an average crystallite size of from 0.25 µm to 8 µm, preferably from 0.3 µm to 1.5 µm. In particular, the $ZrO_2$ is present in a proportion of from 10% by weight to 25% by weight, very particularly preferably from 15% by weight to 22% by weight. $ZrO_2$ is also used as starting material for producing the ceramic abrasive particle of the disclosure. $ZrO_2$ is likewise known per se to a person skilled in the art and is commercially available, for example in powder form. It has been found that an increased proportion of $ZrO_2$ has an advantageous effect on the abrasive performance of abrasive articles which are provided with the abrasive particles of the disclosure. It is assumed that a continuous, microcrystalline degradation of the abrasive particles which continually exposes new and sharp cutting edges is achieved by the increased proportion of $ZrO_2$. An increased proportion of $ZrO_2$ could be associated with an increased number of weak places in the microstructure of the abrasive particles, which weak places have a positive effect on the abrasive properties of the abrasive particles. An abrasive particle having a proportion of alpha-$Al_2O_3$ and $ZrO_2$ is also referred to as two-phase abrasive particle. Here, an average crystallite size is the grain size of the alpha-$Al_2O_3$ or $ZrO_2$ crystallite in the shaped ceramic abrasive particle. Here, an average crystallite size means that an average is formed from a particular number of measured values of the crystallite size. The crystalline size can be determined by means of methods known per se, for example SEM or XRD analysis. For example, the images from an SEM analysis can be evaluated by means of the line intersection method. The line intersection method (also referred to as line method) is known per se to a person skilled in the art from microstructural analysis. Here, an average of all measured intersection segment lengths is formed in order to determine the grain size. A correction factor can optionally also be taken into account in the determination of the average.

The disclosure further provides an abrasive article which comprises shaped ceramic abrasive particles according to the disclosure, i.e. abrasive particles which have at least one structure-weakening element.

In one variant of the abrasive article, shaped abrasive particles without at least one structure-weakening element and/or unshaped, in particular broken, abrasive particles and/or partially shaped abrasive particles are also present in addition to the shaped ceramic abrasive particles according to the disclosure. These abrasive particles without structure-weakening element and these shaped abrasive particles and/or partially shaped abrasive particles serve, for example, as support particles. In this variant of the abrasive article, the proportion of shaped ceramic abrasive particles according to the disclosure having at least one structure-weakening element is at least 5%, in particular at least 15%, preferably at least 25%, particularly preferably at least 50%, based on the total amount of abrasive particles (for example able to be determined in percent by weight). Unshaped ceramic abrasive particles do not have a defined geometry, in contrast to shaped ceramic abrasive particles. They do not have a defined three-dimensional shape of defined size. No defined shaping process takes place in the production of such abrasive particles. Unshaped abrasive particles are of an irregular configuration and are randomly shaped. They can be produced by comminution, for example by crushing, with the comminution occurring in a random manner, so that the abrasive particles are formed by fragments. Such unshaped, in particular broken, abrasive particles are adequately known to those skilled in the art. The production thereof is described, for example, in EP 947485 A1. Partially shaped ceramic abrasive particles do not have a completely defined geometry, in contrast to shaped ceramic abrasive particles. Partially shaped abrasive particles partially have, in contrast to unshaped abrasive particles, a defined geometry with a partially defined three-dimensional shape of partially defined size. For example, partially shaped abrasive particles have at least one defined side face, in particular at least two defined side faces, and/or at least one defined edge, in particular at least two defined edges. Partially shaped abrasive particles have at least one randomly shaped side face and/or at least one randomly shaped edge. Such abrasive particles can, for example, be produced by firstly carrying out shaping to give a precursor and subsequently carrying out comminution of the precursor. Thus, for example, a layer having two essentially parallel side faces can firstly be formed. This layer can subsequently be comminuted in a random manner, producing irregularly shaped fracture edges. Such partially shaped abrasive particles are, for example, described in DE 102015108812 A1.

It has been found that an abrasive article having a mixture of abrasive particles having at least one structure-weakening element and abrasive particles without at least one structure-weakening element likewise gives an improved abrasive performance. Compared to an abrasive article in which only abrasive particles having at least one structure-weakening element are present, such an abrasive article has the advantage that the abrasive article is cheaper.

The abrasive article is, in particular, a coated abrasive article. The abrasive article comprises, in particular, a flexible substrate having at least one layer, in particular of paper, paperboard, vulcanized fiber, foam, a polymer, a textile structure, in particular a woven fabric, formed-loop knitteds, drawn-loop knitteds, braid, nonwoven, or a combination of these materials, in particular paper and woven fabric, in one or more layers. The flexible substrate gives the abrasive article specific properties in respect of adhesion, elongation, tear strength and tensile strength, flexibility and stability.

In a coated abrasive article, the abrasive particles adhere, in particular by means of a base binder, to the flexible substrate. The abrasive particles are prepositioned, in particular in the desired orientation and distribution, on the substrate by means of the base binder. Suitable base binders for applying abrasive particles to a flexible substrate are adequately known to those skilled in the art from the prior art. Possible base binders are, in particular, synthetic resins, for example phenolic resin, epoxy resin, urea resin, melamine resin, polyester resin. In addition to the base binder, the abrasive article can comprise at least one covering binder, for example two covering binders. The covering binder or binders is/are, in particular, applied in layers to the base binder and the abrasive particles. Here, the covering binder or binders joins the abrasive particles firmly to one another and firmly to the substrate. Suitable covering binders are also adequately known to those skilled in the art from the prior art. Possible covering binders are, in particular, synthetic resins, for example phenolic resin, epoxy resin, urea resin, melamine resin, polyester resin. In addition, further binders and/or additives can be provided in order to give the abrasive article specific properties. Such binders and/or additives are well known to a person skilled in the art.

Alternative abrasive articles, for example bonded abrasive articles, are likewise possible. Bonded abrasive articles are, in particular, parting disks and grinding disks bonded by synthetic resin, which are well known to a person skilled in the art. To produce parting and grinding disks bonded by synthetic resin, a composition is mixed from abrasive minerals together with fillers, pulverulent resin and liquid resin and this composition is then pressed to give parting and grinding disks having various thicknesses and diameters.

The abrasive article can be present in various manufactured forms, for example as abrasive disk or as abrasive band, as sheet, roller or strip.

The disclosure further provides a casting mold for producing the abrasive particles of the disclosure in a process according to the disclosure for producing the abrasive particles. The casting mold for producing shaped ceramic abrasive particles, in particular shaped ceramic abrasive particles having at least one structure-weakening element configured as open recess in the material and/or for producing ceramic abrasive particles having at least one structure-weakening element configured as material projection and/or material overhang has at least one mold cavity, preferably a plurality of mold cavities, with the at least one mold cavity having a lower mold surface, a mold side wall and a depth between lower mold surface and surface of the casting mold. In one embodiment, the depth is about 450 nm. The mold cavity has a shape complementary to the shape of at least part of the surface of the abrasive particle, with the cross-sectional geometry of the at least one mold cavity parallel to the lower mold surface being selected essentially from among triangular, rectangular, star-shaped, polygonal, in particular isogonal, or other regular or irregular polygonal shapes. To form the open recess in the material, the mold cavity can have corresponding projections and/or indentations and/or dents or the like. To form a material projection and/or a material overhang, the mold side wall and the surface of the casting mold can be joined by a radius of curvature of 25 µm, preferably 50 µm, particularly preferably 100 µm.

The casting mold can, for example, contain or consist of silicone or other, in particular thermoplastic, polymers such as thermoplastic polyurethane (TPU), polyvinyl chloride (PVC) or the like. The depressions can have an open top surface through which a dispersion can be introduced.

The disclosure additionally provides a process for producing a shaped ceramic abrasive particle, where the abrasive particle has at least one structure-weakening element. The process comprises the following steps:
  a) production of a slip from at least one alpha-$Al_2O_3$ powder, in particular with additions of a $ZrO_2$ powder, and a dispersion medium, with the slip having a solids content of from 50% by weight to 90% by weight and an average particle size of from 0.1 µm to 8 µm;
  b) introduction of the slip into depressions of a casting mold, with the depressions having a defined geometry;
  c) drying of the slip in the depressions to give abrasive particle precursors, with a solids content of the abrasive particle precursors being from 85% by weight to 99.9% by weight;
  d) removal of the abrasive particle precursors from the depressions;
  e) sintering of the abrasive particle precursors to give abrasive particles.

The process of the disclosure is in this embodiment based on the slip process. The production of the shaped ceramic abrasive particles of the disclosure is in particular not carried out by the sol-gel process which is adequately known from the literature. The individual process steps are, in particular, explained in more detail in DE 10 2017 207 322 A1.

It may be remarked that a structure-weakening element in the form of a material projection and/or in the form of a material overhang can be realized in a particularly simple way as early as in the shaping process in the production of the abrasive particle by means of an appropriately shaped casting mold. Structure-weakening elements configured as open recess in the material can also be realized in a similar, particularly simple way as early as in the shaping process in the production of the abrasive particle by means of an appropriately shaped casting mold, for example by means of dents provided in the casting mold.

It may also be remarked that a structure-weakening element in the form of a closed recess in the material can be realized in a particularly simple way as early as in the shaping process in the production of the abrasive particle by means of appropriate processing and conditioning of the slip. In particular, the production parameters such as a viscosity of the slip, a wetting behavior of the slip, the rate of introduction of the slip into the mold cavities, a pressure prevailing during introduction of the slip into the mold cavities or the like can influence the formation of structure-weakening elements configured as closed recess in the material. For example, in order to produce closed recesses in the material in the form of air bubbles, the slip should not be too fluid on introduction into the mold cavities in order to suppress the ascent of air bubbles present in the slip introduced into the mold cavities. Furthermore, a viscosity of from about 0.01 Pa·s to 5 Pa·s at a shear rate of 100 l/s can assist the formation of air bubbles. Further assistance can be obtained when the slip has not been degassed (i.e. stirred under subatmospheric pressure) after milling.

BRIEF DESCRIPTION OF THE DRAWINGS

The disclosure is illustrated in the following description with the aid of working examples depicted in the drawings. The drawings, the description and the claims contain numerous features in combination. A person skilled in the art will also advantageously look at the features individually and put them together to form purposeful further combinations. Identical reference numerals in the figures denote identical elements.

The figures show.

DETAILED DESCRIPTION

Figure 1:
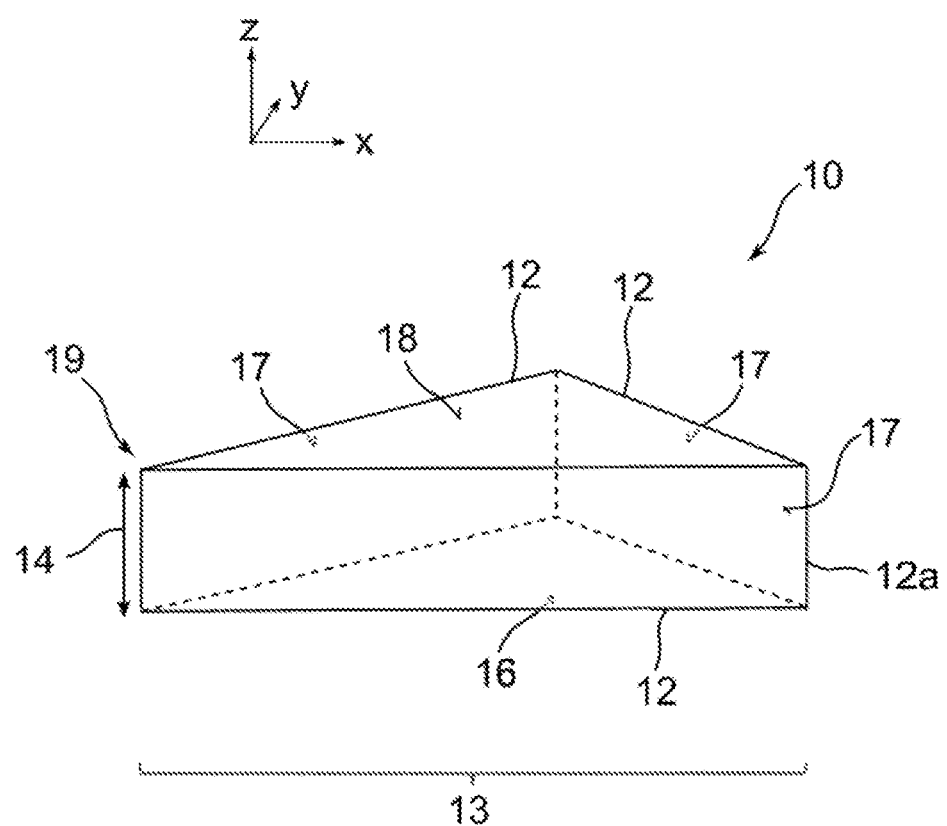
FIG. 1 a schematic view of an embodiment of a ceramic shaped abrasive particle according to the prior art.

FIG. 1 schematically depicts (in particular not true-to-scale) an illustrative embodiment of a shaped ceramic abrasive particle 10 as is known from the prior art. The geometric shape of the abrasive particle 10 is formed by a regular three-sided right prism having the side edges and the height edges 12a having the height 14. Side edges and height edges will hereinafter also be referred to collectively as edges 12, 12a. The base area 16 and the top surface 18 are accordingly formed in each case by three side edges 12 of equal length. The base area 16 and the top surface 18 have the same size and are separated from one another by the height 14. The three side faces 17 are formed by rectangles and have essentially the same size. In the illustrated embodiment of FIG. 1, the side edges 12 have a length 13 of 1400 µm. The height 14 is 410 µm. In an alternative embodiment, the length 13 of the side edge 12 can also be 1330 µm and the height 14 can be 400 µm. The ceramic abrasive particle 10 is produced on the basis of alpha-$Al_2O_3$.

The shaped ceramic abrasive particle 10 depicted by way of example in FIG. 1 forms, in the following, the starting basis for the presentation of working examples of the proposed shaped ceramic abrasive particle 20, 20a-e, which according to the disclosure has at least one structure-weakening element 22, 22a-d. The proposed shaped ceramic abrasive particle 20, 20a-e is likewise produced on the basis of alpha-$Al_2O_3$ and has at least three faces, here by way of example two side faces 17 and the top surface 18, of which at least two faces form a common edge 12, 12a, for example a side face 17 and the top surface 18 form a side edge 12, on which at least one corner 19 which is common to the three faces is located.

In the following figures, which each depict illustrative embodiments of the abrasive particle 20, 20a-e according to the disclosure in views which are likewise schematic and not true-to-scale, the reference numerals for labeling the side edges, faces, etc., have not been inserted for reasons of clarity—they can, however, be carried over directly from FIG. 1. The nomenclature for the abrasive particle 10 introduced by means of FIG. 1 can be carried over directly to the following working examples.

Figure 2:
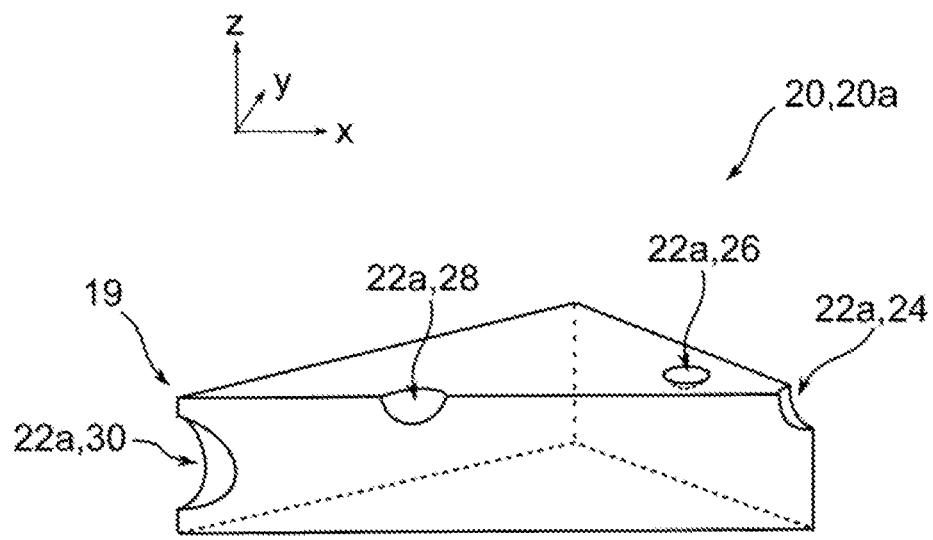
FIG. 2 a schematic view of an embodiment of a ceramic shaped abrasive particle according to the disclosure having at least one structure-weakening element configured as open recess in the material.

FIG. 2 depicts an illustrative embodiment of the ceramic shaped abrasive particle 20a according to the disclosure having four structure-weakening elements 22a configured as open recesses 24-30 in the material. A first structure-weakening element 22a is configured as an open recess 24 in the material in the form of a hollow or indentation on the at least one corner 19 of the abrasive particle 20, 20a. A second structure-weakening element 22a is configured as an open recess 26 in the material in the form of a hollow or indentation on the top surface 18. Third and fourth structure-weakening elements 22a are configured as open recesses 26, 28 in the material in the form of a hollow or indentation on a side edge 12 or on a height edge 12a. The structure-weakening elements 22a are in this case present eccentrically to the center of gravity of the abrasive particle 20, 20a, which is located in the center of the abrasive particle 20, 20a (not shown in more detail).

Figure 3:
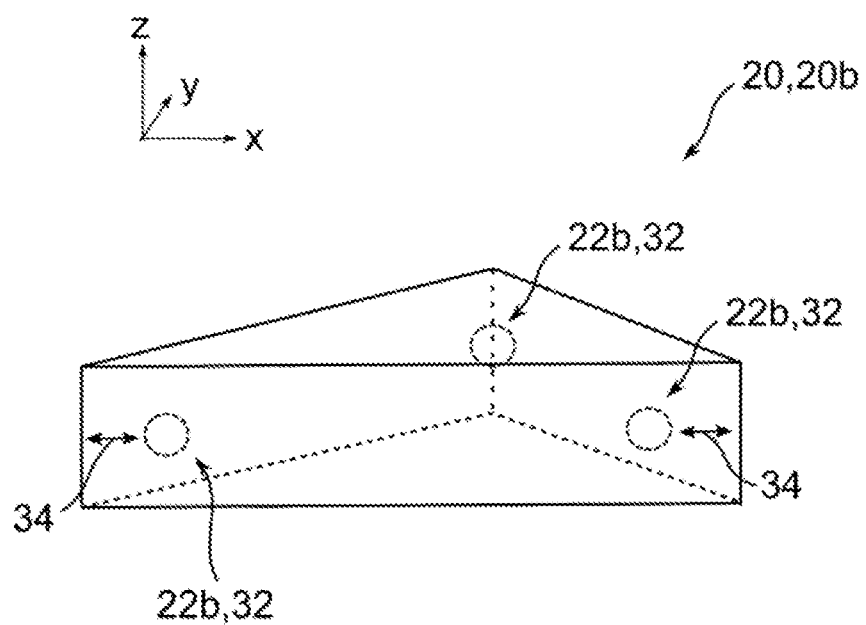
FIG. 3 a schematic view of an embodiment of a ceramic shaped abrasive particle according to the disclosure having at least one structure-weakening element configured as closed recess in the material.

FIG. 3 depicts an illustrative embodiment of the ceramic shaped abrasive particle 20b according to the disclosure having three structure-weakening elements 22b configured as closed recesses 32 in the material. The three structure-weakening elements 22b are each configured as closed recess 32 in the material in the form of a void, in particular a bubble, completely within the interior of the material of the abrasive particle 20, 20b. The structure-weakening elements 22b are likewise positioned eccentrically to the center of gravity of the abrasive particle 20b, which in the abrasive particle 20, 20b depicted in FIG. 3, too, is located in the center of the abrasive particle 20, 20b (not shown in more detail). The structure-weakening elements 22b are each at a distance 34, which is about 20 µm-30 µm, from one of the at least three height edges 12a.

The structure-weakening elements 22, 22a, 22b depicted in FIGS. 2 and 3 each have an essentially convexly curved, in particular spherical, shape, with a radius of the convexly curved recess in the material being about 50 µm. It may be remarked that, in one illustrative embodiment of the abrasive particle 20, a plurality of structure-weakening elements 22a, 22b configured as open recesses 24-30 in the material and as closed recesses 32 in the material can be provided simultaneously in the abrasive particle 20 (cf. FIG. 5).

Figure 4:
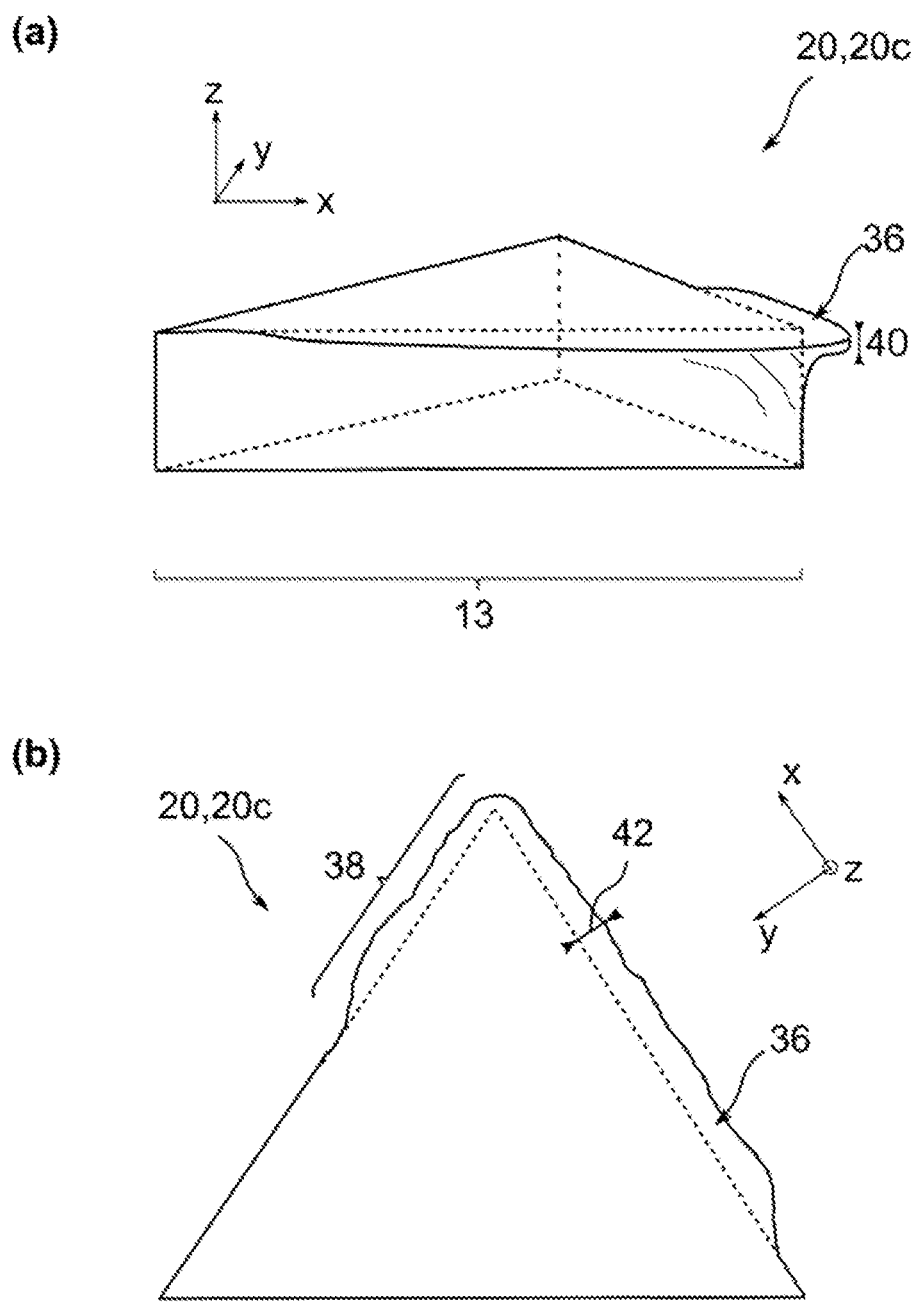
FIG. 4 a schematic view of an embodiment of a ceramic shaped abrasive particle according to the disclosure having at least one structure-weakening element configured as material projection.
Figure 4:
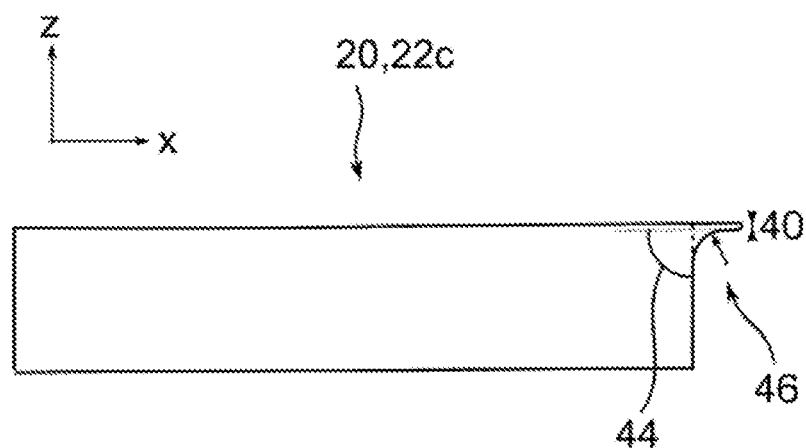

FIG. 4 depicts an illustrative embodiment of the ceramic shaped abrasive particle 20c according to the disclosure having a structure-weakening element 22c configured as material projection 36 on two side edges 12 and the corner 19 between the two side edges 12. FIG. 4a shows the abrasive particle 20c in a schematic perspective view, while FIG. 4b shows a plan view and FIG. 4c shows a side view of the abrasive particle 20c (cf. coordinate system shown for orientation). The broken line indicates edges 12, 12a of the abrasive particle 20c in the original geometry (cf. FIG. 1) which are not visible, with the edges 12, 12a either being located on the rear side of the abrasive particle 20c or no longer being present because of the material projection 36. In the working example depicted, the material projection 36 runs along at least 45% of the length of one of the side edges 12 (left-hand and right-hand edge 12), indicated by the curly bracket 38. The material projection 36 has an approximate (average) thickness 40 of about 25-30 µm. Furthermore, the material projection 36 extends by an (average) distance 42 of about 60 µm beyond the side edge 12. The material projection 36 encloses an angle 44 of about 85° with the top surface 18. Here, the material projection 36 is joined on by means of a curved, in particular continuous, transition which can be described by a radius of curvature 46. In the working example depicted in FIG. 4, the radius of curvature is about 70 µm.

Figure 5:
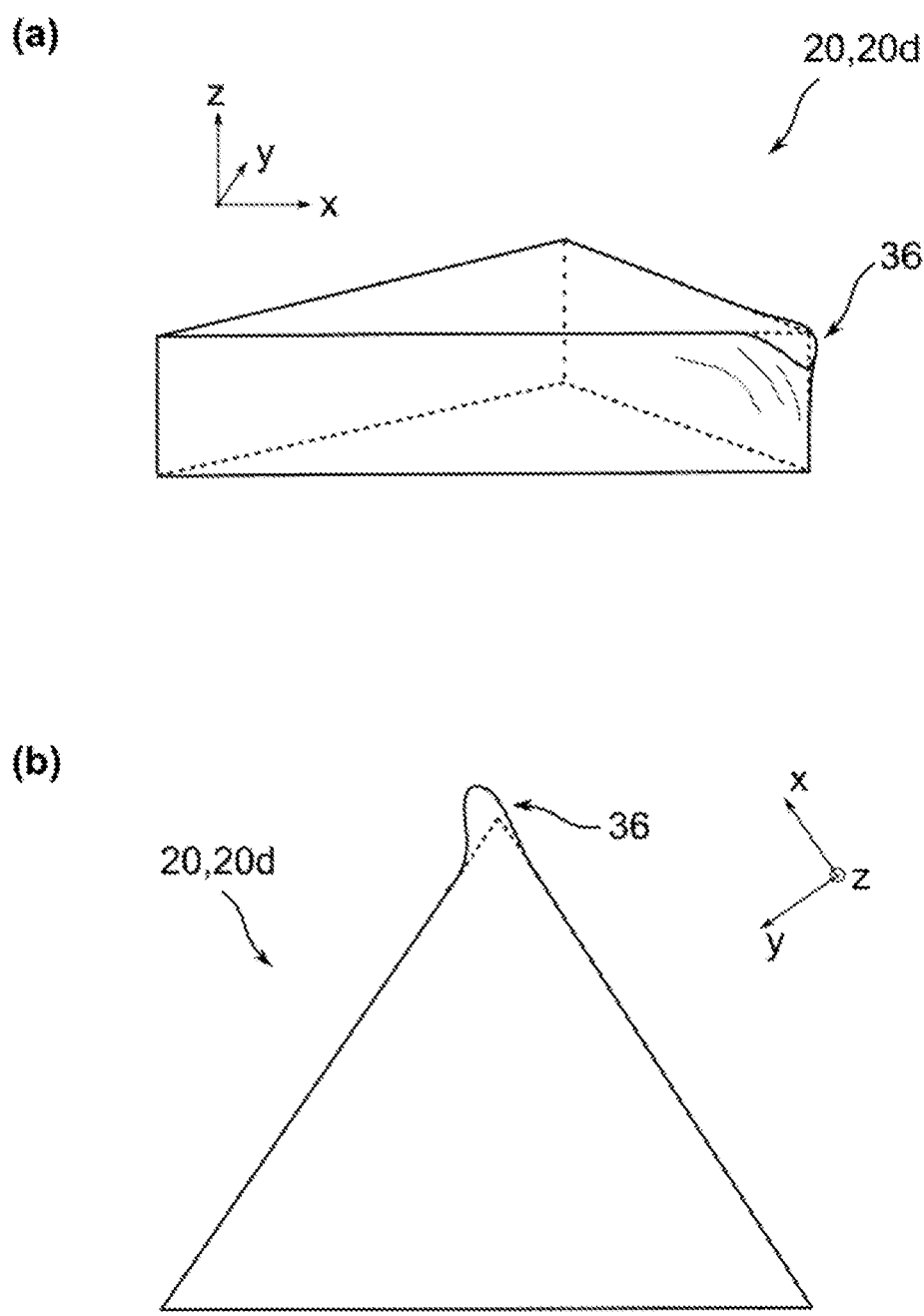
FIG. 5 a schematic view of an alternative embodiment of a ceramic shaped abrasive particle according to the disclosure having at least one structure-weakening element configured as material projection.

FIG. 5 depicts an alternative, illustrative embodiment of the ceramic shaped abrasive particle 20d according to the disclosure having a structure-weakening element 22d configured as material projection 36 at a side edge 12, in particular at a corner 19. FIG. 5a shows the abrasive particle 20c in a schematic perspective view, while FIG. 5b shows a plan view (cf. coordinate system depicted for orientation). The broken line likewise indicates edges 12, 12a of the abrasive particle 20d in the original geometry (cf. FIG. 1) which are not visible, with the edges 12, 12a either being located on the rear side of the abrasive particle 20d or no longer being present because of the material projection 36. The material projection 36 has the shape of a "nose" at one of the corners 19, in particular also at a height edge 12a.

Figure 6:
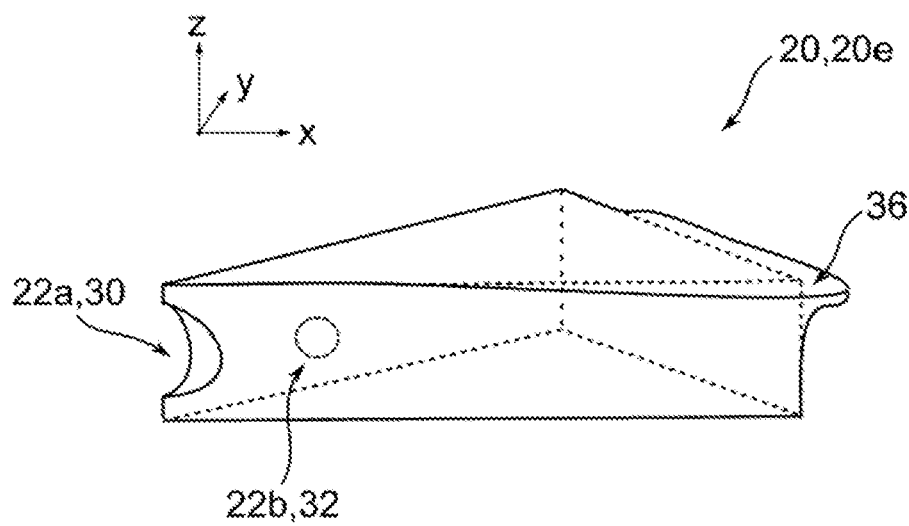
FIG. 6 a schematic view of an embodiment of a ceramic shaped abrasive particle according to the disclosure having at least one structure-weakening element configured as material projection, a structure-weakening element configured as closed recess in the material and also a structure-weakening element configured as open recess in the material.

FIG. 6 depicts an illustrative embodiment of the ceramic shaped abrasive particle 20e according to the disclosure having a structure-weakening element 22b configured as closed recess 32 in the material, having a structure-weakening element 22a configured as open recess 30 in the material and having a structure-weakening element 22c configured as material projection 36 and two side edges 12 and the corner 19 between the two side edges 12. The abrasive particle thus has a plurality of different structure-weakening elements 22, 22a, 22b, 22c.

Figure 7:
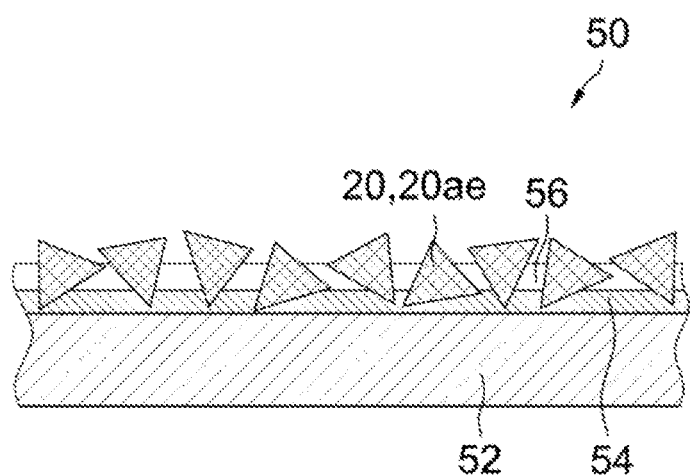
FIG. 7 a section of a schematic sectional view of an embodiment of the abrasive article according the disclosure.

FIG. 7 shows a section of an illustrative embodiment of an abrasive article 50 according to the disclosure with abrasive particles 20, 20a-e in a schematic sectional view. The abrasive article 50 is, in the embodiment depicted, a coated abrasive article 50 having a support element 52 made of vulcanized fiber. The support element 52 made of vulcanized fiber serves as flexible substrate for the abrasive particles 20, 20a-e. Vulcanized fiber is a composite material composed of cellulose, in particular cotton fibers or cellulose fibers, and is adequately known to a person skilled in the art as flexible substrate for abrasive articles from the prior art. The abrasive particles 20, 20a-e are fastened by means of a base binder 54, for example composed of phenolic resin, to the support element 52. The layer of base binder 54 and abrasive particles 20, 20a-e is coated with a covering binder 56, for example composed of phenolic resin.

Figure 8:
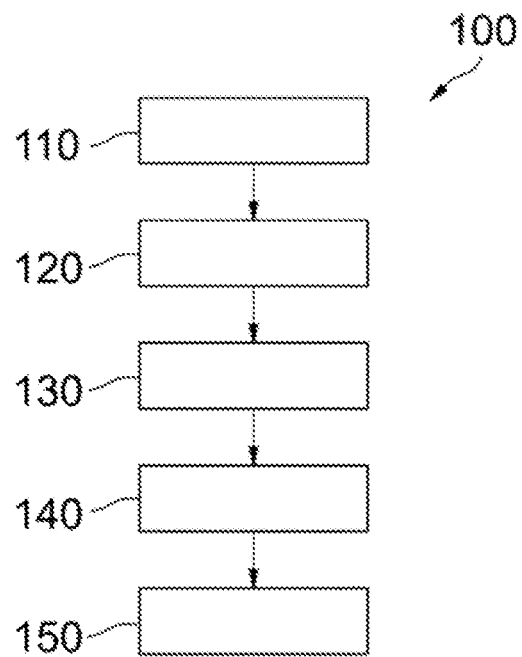
FIG. 8 a flow diagram to indicate the process steps for producing a shaped ceramic abrasive particle according to the disclosure.

The process according to the disclosure for producing shaped ceramic abrasive particles will be illustrated with the aid of the flow diagram of FIG. 8. The production process 100 comprises the following steps. In a first step 110, a slip is produced from at least one alpha-$Al_2O_3$ powder and a dispersion median, with the slip having a solids content of from 50% by weight to 90% by weight and an average particle size of from 0.1 μm to 8 μm. In one embodiment of the process, a $ZrO_2$ powder can additionally be used. In a second step 120, the slip is introduced into depressions in a casting mold (not shown in more detail), with the depressions having a defined geometry. The casting mold has, in particular, a plurality of mold cavities, with the plurality of mold cavities comprising a lower mold surface, a mold side wall and a depth between lower mold surface and surface of the casting mold. The mold side wall and the surface of the casting mold are, in this working example, joined by a radius of curvature of 70 μm (cf. explanation of FIG. 4). Drying of the slip in the depressions is then carried out in a third step 130 to give abrasive particle precursors which have a solids content of from 85% by weight to 99.9% by weight. After drying of the slip, the abrasive particle precursors are removed from the depressions in a fourth step 140. In addition, the abrasive particle precursors are sintered in a fifth step 150 to give abrasive particles based on alpha-$Al_2O_3$ having a content of $ZrO_2$ of from 5% by weight to 30% by weight and a density of from 92% to 99.9% of the theoretical density, with the alpha-$Al_2O_3$ having an average crystallite size of from 0.5 μm to 3 μm and the $ZrO_2$ having an average crystallite size of from 0.25 μm to 8 μm.

The invention claimed is:

1. A shaped ceramic abrasive particle comprising:
   at least three faces, of which at least two faces form a common edge on which at least one corner common to the at least three faces is located; and
   at least one structure-weakening element comprising a closed recess defined in the shaped ceramic abrasive particle, the closed recess having a substantially convexly curved shape,
   wherein the closed recess is formed as a void, a bubble, or a pore defined in the material of the abrasive particle,
   wherein the closed recess has a spherical, ball-like shape, and
   wherein the spherical, ball like shape has a radius of curvature of from 10 μm to 200 μm.

2. The shaped ceramic abrasive particle as claimed in claim 1, wherein the at least one structure-weakening element is located eccentrically to a center of gravity of the abrasive particle.

3. The shaped ceramic abrasive particle as claimed in claim 1, wherein the closed recess is at a distance which is in a range from 1% to 50% of an average diameter of the abrasive particle from one of (i) one of the at least three faces, (ii) the at least one edge, and (iii) the at least one corner of the abrasive particle.

4. The shaped ceramic abrasive particle as claimed in claim 1, wherein the at least one structure-weakening element further comprises at least one open recess defined in the material and/or at least one additional closed recess defined in the material.

5. The shaped ceramic abrasive particle as claimed in claim 1, wherein the abrasive particle is based on alpha-$Al_2O_3$.

6. The shaped ceramic abrasive particle as claimed in claim 1, wherein the spherical, ball like shape has a radius of curvature of from 25 μm to 175 μm.

7. The shaped ceramic abrasive particle as claimed in claim 1, wherein the spherical, ball like shape has a radius of curvature of from 25 μm to 50 μm.

8. A shaped ceramic abrasive particle comprising:
   at least three faces, of which at least two faces form a common edge on which at least one corner common to the at least three faces is located; and
   at least one structure-weakening element comprising a closed recess defined in the shaped ceramic abrasive particle, the closed recess having a substantially convexly curved shape,
   wherein the essentially convexly curved shape has a radius of curvature of from 10 μm to 200 μm.

9. The shaped ceramic abrasive particle as claimed in claim 8, wherein the closed recess is formed as a void, a bubble, or a pore defined in the material of the abrasive particle.

10. The shaped ceramic abrasive particle as claimed in claim 9, wherein the closed recess has a spherical, ball-like shape.

11. A shaped ceramic abrasive particle comprising:
    at least three faces, of which at least two faces form a common edge on which at least one corner common to the at least three faces is located; and
    at least one structure-weakening element comprising a closed recess defined in the shaped ceramic abrasive particle, the closed recess having a substantially convexly curved shape,
    wherein the at least one structure-weakening element further comprises at least one of a material projection and a material overhang at the at least one edge and/or at the at least one corner of the abrasive particle.

12. The shaped ceramic abrasive particle as claimed in claim 11, wherein the at least one of the material projection and the material overhang extends along at least 10% of a length of the at least one edge.

13. The shaped ceramic abrasive particle as claimed in claim 11, wherein the at least one of the material projection and the material overhang has a thickness of from about 10 μm to 100 μm.

14. The shaped ceramic abrasive particle as claimed in claim 11, wherein the at least one of the material projection and the material overhang extends for a distance of at least 20 μm beyond the at least one edge.

15. The shaped ceramic abrasive particle as claimed in claim 11, wherein the at least one of the material projection and the material overhang defines an angle in the range from 10° to 90° with at least one of the at least three faces.

16. The shaped ceramic abrasive particle as claimed in claim 11, wherein the closed recess has a spherical, ball like shape with a radius of curvature of from 10 μm to 200 μm.

17. An abrasive article comprising:
    a plurality of the shaped ceramic abrasive particles as claimed in claim 1.

18. The abrasive article as claimed in claim 17, further comprising wherein:
    the abrasive article includes a total number of abrasive particles, which includes the plurality of the shaped ceramic abrasive particles, and
    the plurality of the shaped ceramic abrasive particles comprises at least 5% of the total number of abrasive particles.

19. A process for producing the shaped ceramic abrasive particles as claimed in claim 1.

* * * * *